United States Patent
Yun et al.

(10) Patent No.: US 10,996,792 B2
(45) Date of Patent: May 4, 2021

(54) PARTIAL MUTUAL CAPACITIVE TOUCH SENSING IN A TOUCH SENSITIVE DEVICE

(71) Applicant: STMicroelectronics Asia Pacific Pte Ltd, Singapore (SG)

(72) Inventors: Abe Yun, Yongin-Si (KP); Aiden Jeon, Seoul (KP); Glen Kang, Seoul (KP)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/130,332

(22) Filed: Sep. 13, 2018

(65) Prior Publication Data

US 2019/0087035 A1 Mar. 21, 2019

Related U.S. Application Data

(60) Provisional application No. 62/559,264, filed on Sep. 15, 2017.

(51) Int. Cl.
*G06F 3/044* (2006.01)
*G06F 3/041* (2006.01)
*G06F 3/047* (2006.01)

(52) U.S. Cl.
CPC ........ *G06F 3/041662* (2019.05); *G06F 3/047* (2013.01); *G06F 3/0446* (2019.05); *G06F 3/041661* (2019.05)

(58) Field of Classification Search
CPC ............. G06F 3/0414; G06F 3/041661; G06F 3/041662; G06F 3/044; G06F 3/047
See application file for complete search history.

(56) References Cited

U.S. PATENT DOCUMENTS

| | | | |
|---|---|---|---|
| 2011/0050618 A1* | 3/2011 | Murphy | G06F 1/3215 345/174 |
| 2013/0257799 A1* | 10/2013 | Lamont | G06F 3/044 345/174 |
| 2014/0210791 A1* | 7/2014 | Hanauer | G06F 3/0416 345/174 |
| 2014/0267152 A1* | 9/2014 | Curtis | G06F 3/041662 345/174 |
| 2016/0216796 A1* | 7/2016 | Johansson | G06F 3/0412 |
| 2016/0349920 A1* | 12/2016 | Di | G06F 3/044 |
| 2017/0108966 A1* | 4/2017 | Nakao | G06F 3/044 |
| 2017/0242539 A1* | 8/2017 | Mani | G06F 3/0418 |
| 2018/0024656 A1* | 1/2018 | Kim | G06F 3/0414 345/174 |

* cited by examiner

*Primary Examiner* — Afroza Chowdhury
(74) *Attorney, Agent, or Firm* — Crowe & Dunlevy (57) ABSTRACT

Disclosed herein is a method of operating a touch screen controller in a device with a touch screen having force lines and sense lines. The method includes receiving touch data from the touch screen, and operating the touch screen in a self capacitance sensing mode. In the self capacitance sensing mode, which force lines have strength values indicating a potential touch to the touch screen are determined. The method also includes operating the touch screen in a mutual capacitance sensing mode, and in the mutual capacitance sensing mode, performing mutual capacitance sensing on only a subset of the force lines, with the subset of the force lines including at least those force lines indicating the potential touch to the touch screen.

16 Claims, 7 Drawing Sheets

PARTIAL MUTUAL CAPACITIVE TOUCH SENSING IN A TOUCH SENSITIVE DEVICE

RELATED APPLICATION

This application claims the benefit and priority of U.S. Provisional Patent Application No. 62/559,264, filed on Sep. 15, 2017, entitled "PARTIAL MUTUAL CAPACITIVE TOUCH SENSING IN A TOUCH SENSITIVE DEVICE", the contents of which are hereby incorporated by reference in their entirety.

TECHNICAL FIELD

This disclosure is related to the field of capacitive touch sensing, and in particular, to techniques for performing both self capacitance sensing and mutual capacitance sensing using a single capacitive touch matrix.

BACKGROUND

A touch screen is a device that can detect an object in contact with or in proximity to a display area. The display area can be covered with a touch-sensitive matrix that can detect a user's touch by way of a finger or stylus, for example. Touch screens are used in various applications such as mobile phones and other mobile devices. A touch screen may enable various types of user input, such as touch selection of items on the screen or alphanumeric input via a displayed virtual keypad. Touch screens can measure various parameters of the user's touch, such as the location, duration, etc.

One type of touch screen is a capacitive touch screen. A capacitive touch screen may include a matrix of conductive rows and conductive columns overlaid on the display area. The conductive rows and the conductive columns are spaced apart from one another so as to not make contact. The capacitive touch screen may be used for mutual capacitance sensing or for self capacitance sensing.

In mutual capacitance sensing, the capacitance between each row and column of the matrix may be sensed. A change in the sensed capacitance between a row and a column may indicate that an object, such as a finger, is touching the screen or is in proximity to the screen near the region of intersection of the row and column. Mutual capacitance sensing circuits employ a "forcing" signal applied to a column conductor of the capacitive touch matrix and sensing of the coupled signal on respective row conductors (or vice-versa).

In self capacitance sensing, the capacitance between a conductive element of the capacitive touch matrix (such as a row or column) and a reference voltage (such as ground) is sensed. A change in the sensed capacitance may indicate that an object, such as a finger, is touching the screen or is in proximity to the screen near the conductive element being sensed. The scanning of the capacitive touch matrix involves alternate sensing of the conductive rows and the conductive columns.

Mutual capacitance sensing and self capacitance sensing have advantages and disadvantages in different applications. Therefore, it is desirable to develop touch sensing techniques that use both mutual capacitance sensing and self capacitance sensing.

SUMMARY

Disclosed herein is a method of operating a touch screen controller in a device with a touch screen having force lines and sense lines. The method includes receiving touch data from the touch screen, and operating the touch screen in a self capacitance sensing mode. In the self capacitance sensing mode, which force lines have strength values indicating a potential touch to the touch screen are determined. The method also includes operating the touch screen in a mutual capacitance sensing mode, and in the mutual capacitance sensing mode, performing mutual capacitance sensing on only a subset of the force lines, with the subset of the force lines including at least those force lines indicating the potential touch to the touch screen.

The subset of the force lines may be fewer in number than a set of all of the force lines, and the subset of the force lines may include only those force lines indicating the potential touch to the screen.

The force lines having the strength values indicating the potential touch may be determined by determining which force lines have strength values that are greater than a threshold value.

In the mutual capacitance sensing mode, the mutual capacitance sensing may be performed on only those force lines which have strength values greater than the threshold value.

The method may also include determining a coordinate of a touch to the touch screen as a function of the mutual capacitance sensing performed on the force lines which have strength values greater than the threshold value.

Also disclosed herein is a method of touch sensing for a touch screen having a first plurality of conductive lines and a second plurality of conductive lines intersecting the first plurality of conductive lines. The method includes operating, in a self capacitance sensing mode, by driving the first and second pluralities of conductive lines with a forcing signal, and measuring strength values at the first plurality of conductive lines and the second plurality of conductive lines. The method further includes operating the touch screen in a mutual capacitance sensing mode, and in the mutual capacitance sensing mode, driving only a subset of the first plurality of conductive lines and measuring strength values at the second plurality of conductive lines during driving of the subset of the first plurality of conductive lines, with the subset including those of the first plurality of conductive lines having self capacitance measured strength values indicating a potential touch to the touch screen with a forcing signal.

The ones of the first plurality of conductive line having measured strength values indicating the potential touch may have measured strength values that are greater than a threshold value.

In the mutual capacitance sensing mode, only ones of the first plurality of conductive lines having measured strength values indicating the potential touch may be driven with the forcing signal.

A coordinate of a touch to the touch screen may be determined as a function of the strength values measured at the second plurality of conductive lines in the mutual capacitance sensing mode.

Another aspect disclosed herein is a touch screen controller operable with a touch screen having force lines and sense lines. The touch screen controller includes input circuitry configured to receive touch data from the touch screen, and processing circuitry. The processing circuitry is configured to operate the touch screen in a self capacitance sensing mode, and in the self capacitance sensing mode determine a subset of the force lines which have strength values in a range indicating a potential touch to the touch screen, and operate the touch screen in a mutual capacitance sensing mode, and in the mutual capacitance sensing mode, perform mutual capacitance sensing on the determined subset of force lines.

The processing circuitry may be further configured to determine the subset of the force lines which have the strength values in the range indicating a potential touch by determining which force lines have strength values that are greater than a threshold value.

The subset of the force lines may exclude force lines which have strength values outside of the range indicating the potential touch.

The subset of the force lines may exclude force lines which have strength values outside of the range indicating the potential touch have strength values that are less than a threshold value.

The processing circuitry may be further configured to determine a coordinate of a touch to the touch screen as a function of the mutual capacitance sensing performed on the determined subset of force lines.

Another method aspect disclosed herein is a method of operating a touch screen controller in a device with a touch screen having sense channels. This method includes in a sensing frame, in a self capacitance sensing period of the sensing frame, performing self capacitance sensing to detect a potential touch and the sense channels associated with the potential touch, and in a mutual capacitance sensing period of the sensing frame, performing mutual capacitance sensing during only a fraction of the mutual capacitance sensing period, with the mutual capacitance sensing being performed on only those sense channels associated with the potential touch.

The potential touch may be detected by determining which sense channels have strength values exceeding a threshold.

Mutual capacitance sensing may not be performed outside of the fraction of the mutual sensing period.

A coordinate of a touch to the touch screen may be determined as a function of the mutual capacitance sensing performed on those sense channels associated with the potential touch.

BRIEF DESCRIPTION OF THE DRAWINGS

For a better understanding of the described embodiments, reference is made to the accompanying drawings, which are incorporated herein by reference and in which.

DETAILED DESCRIPTION

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed.

Figure 1A:
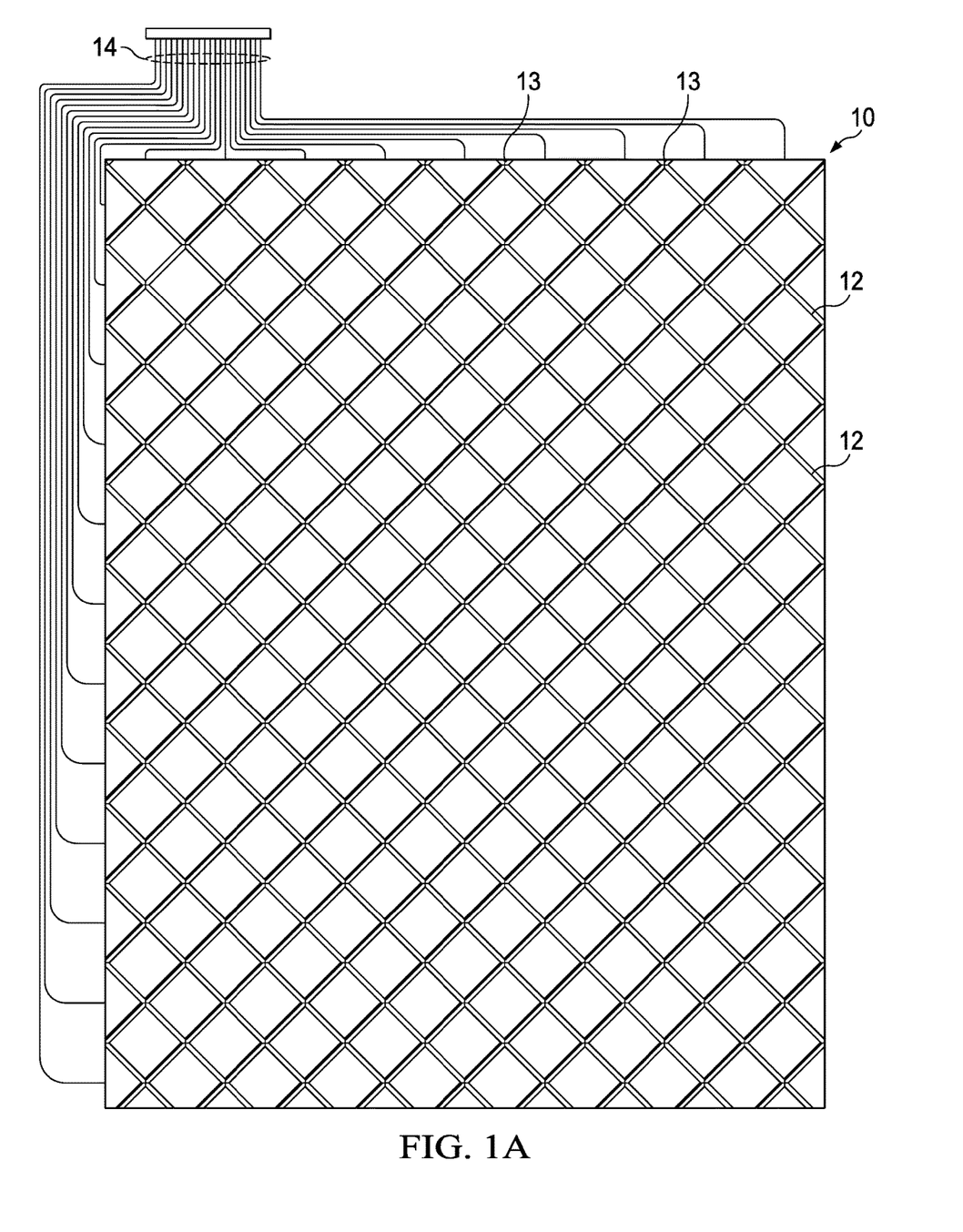
FIG. 1A is a schematic representation of a capacitive touch matrix.

FIG. 1A shows an example of a touch screen having conductive rows 12 and conductive columns 13 of a capacitive touch matrix 10, arranged in a diamond pattern. The capacitive touch matrix 10 may be transparent to allow light from an underlying display unit to pass through the capacitive touch matrix 10 for viewing by a user. A plurality of conductors 14 may be provided for making contact to conductive rows 12 and conductive columns 13. Conductive rows 12 and conductive columns 13 may cover substantially the entire face of the touch screen, enabling touch and proximity detection at substantially any location on the touch screen.

Figure 1B:
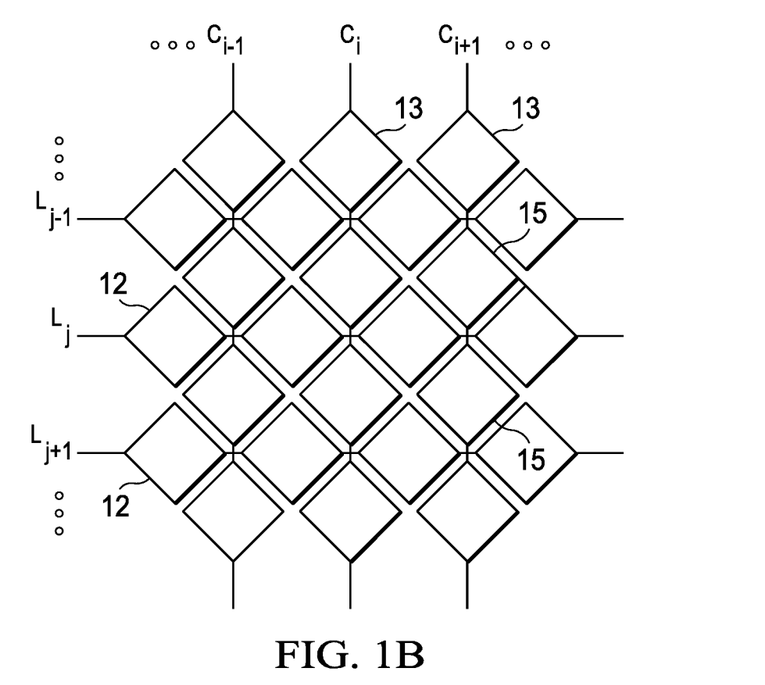
FIG. 1B is an enlarged schematic diagram of a portion of the capacitive touch matrix, showing row and column conductors having diamond configurations.

FIG. 1B shows an enlarged portion of the capacitive touch matrix 10 in further detail. The capacitive touch matrix 10 includes a plurality of conductive columns 13 (Ci) and a plurality of conductive rows 12 (Lj). The conductive columns 13 extend vertically and the conductive rows 12 extend horizontally in FIG. 1B. The conductive rows 12 and the conductive columns 13 cross above or below each other at their intersection points, but are not in contact with one another. Each of the conductive rows 12 and the conductive columns 13 has conductors arranged in a diamond pattern. As a result, the conductive rows 12 and the conductive columns 13 are separated from each other by capacitive gaps 15. The diamond pattern may provide increased capacitance between conductive rows 12 and conductive columns 13, as compared with straight conductors. Capacitive touch matrix 10 may sense an object that modifies the fringing electric field above the capacitive gaps 15 when the object is in contact or in proximity to the screen.

Figure 1C:
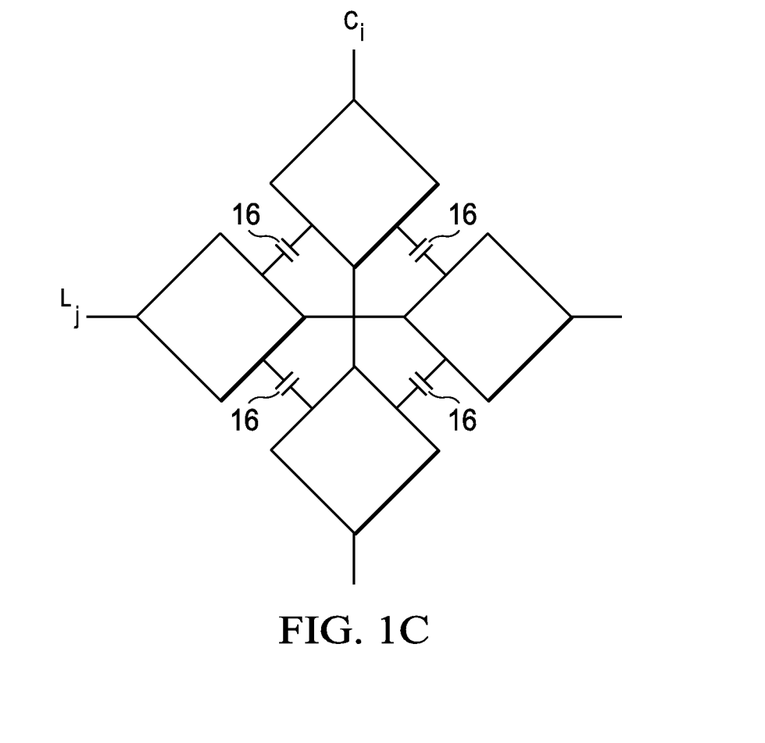
FIG. 1C is a schematic diagram of a single intersection of a row and column, illustrating capacitances between row and column conductors.

FIG. 1C shows that when a conductive column Ci and a conductive row Lj are selected, the total capacitance between column Ci and row Lj is the sum of four capacitances 16 between the four adjacent diamond-shaped regions of column Ci and row Lj. The capacitance between column Ci and row Lj can be sensed to determine whether an object is in contact with or in proximity to the touch screen above the region in which the four capacitances 16 are formed. Each conductive row 12 and conductive column 13 of the capacitive touch matrix may be selected in succession to sense the capacitances at each position of the touch screen.

Figure 2:
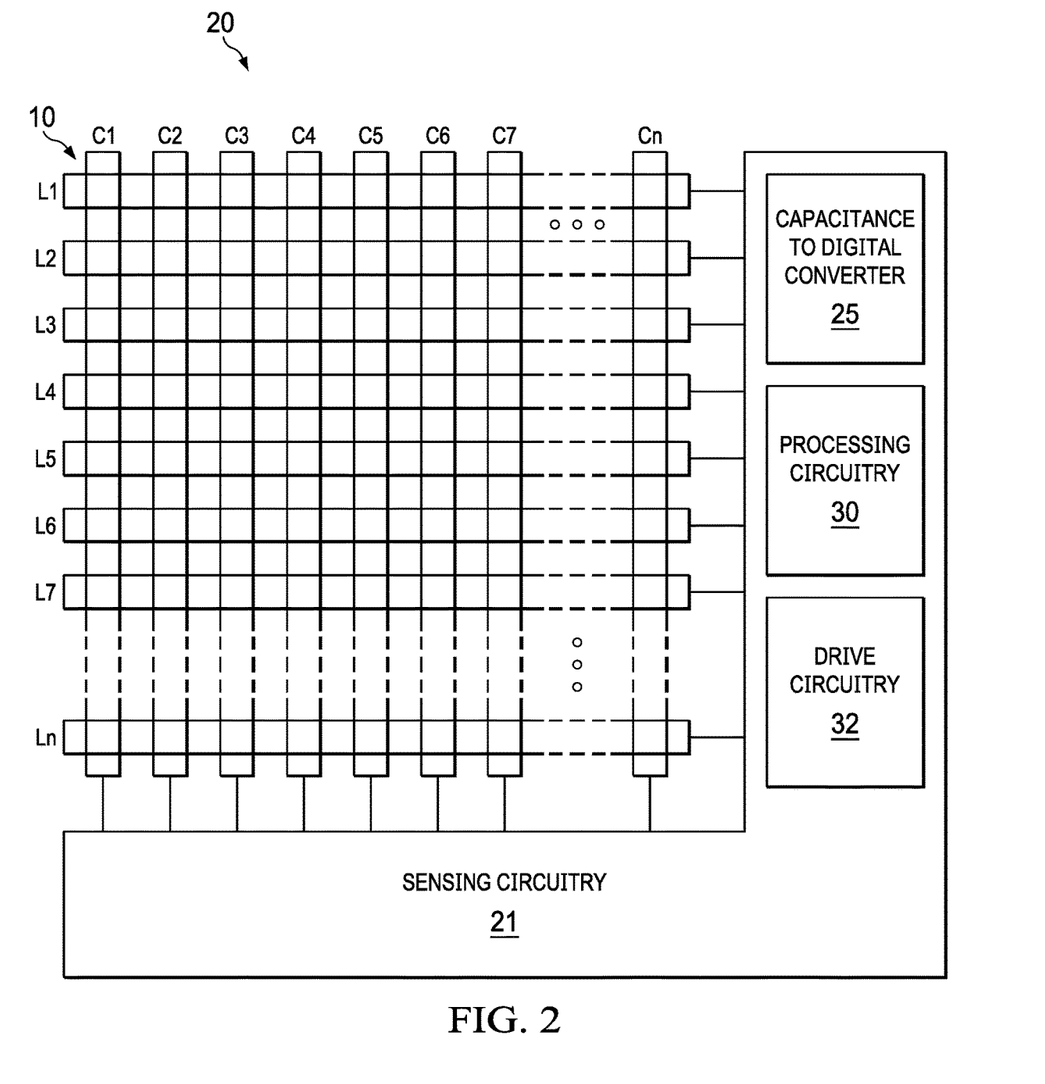
FIG. 2 is a schematic diagram of a touch screen system.

FIG. 2 is a block diagram of a touch screen system 20 that includes the capacitive touch matrix 10 and an associated sensing circuit 21. As discussed above, the capacitive touch matrix 10 may have a diamond pattern, which is not shown in FIG. 2 for clarity. The sensing circuit 21 includes a capacitance-to-digital converter 25 to sense charge from the capacitive touch matrix 10, and processing circuitry 30 to process the converted charge so as to determine a coordinate of the touch, as discussed below.

In mutual capacitance sensing, a forcing signal is applied to a column conductor (or to a row conductor) by drive circuitry 32, and a coupled signal is sensed on one or more row conductors (or column conductors). The rows and columns of the capacitive touch matrix 10 may be scanned in any suitable manner. For example, the capacitance may be sensed between column C1 and rows L1-Ln, then sensed between column C2 and rows L1-Ln, and so on until the capacitance is sensed between column Cn and rows L1-Ln. However, it should be appreciated that this is only an example of a suitable scanning sequence and that any suitable scanning sequence may be used.

At each scanning step, a measurement may be taken from the row/column pair that represents the capacitance between the selected row/column pair. For example, the capacitance between the selected row/column pair may be charged to a determined voltage value. The amount of charge stored depends on the capacitance between the row/column pair. The capacitance between the selected row and column may change when an object is touching the touch screen near the intersection area of the row and column and alters the electric field in this region. To determine whether an object is in the vicinity, the stored charge can be read out and converted into a voltage that is then digitized.

In self capacitance sensing, a forcing signal is applied to the column conductors by the drive circuitry 32, and the capacitance to ground is sensed on the same column conductors. Then, a forcing signal is applied to the row conductors, and the capacitance to ground is sensed on the same row conductors. The combined information from column sensing and row sensing indicates the location of a touch on the capacitive touch matrix. The sequence of sensing on column conductors and sensing on row conductors is repeated.

As stated, self capacitance sensing and mutual capacitance sensing each have their own advantages and disadvantages. For example, self capacitance mode sensing provides excellent sensitivity for detecting a finger hover. A change in capacitance can be detected with respect to a hover in self capacitance mode from as far as few centimeters from the surface of the capacitive touch matrix 10. However, self capacitance mode sensing is prone to a ghosting problem associated with a multi-touch/hover situation because the entire length of the given column or row is used to sense and thus the control circuitry 30 is not able to unambiguously distinguish between different touch/hover instances falling along a same row or column.

Mutual capacitance sensing provides excellent sensitivity for detecting the particular location of a user touch or hover, and enables the control circuitry 30 to distinguish between and identify the locations of multi-touch or hover situations. Unfortunately, mutual capacitance mode has a weak sensitivity for detecting a user hover. For example, a change in capacitance can be detected with respect to a hover using mutual capacitance from as far as only a few nanometers from the surface of the capacitive touch matrix 10.

Therefore, it is desirable for both self capacitance and mutual capacitance sensing to be used on a same capacitive touch matrix 10, as each of these sensing modes addresses the weakness of the other.

Figure 3:
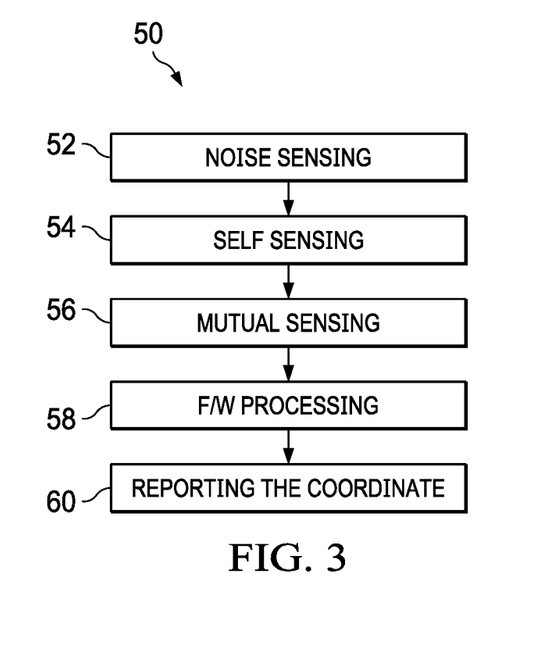
FIG. 3 is a flowchart of a method of operating a touch screen system, such as that of FIG. 2, in both self capacitance and mutual capacitance sensing modes.

One method for using both self capacitance and mutual capacitance sensing on a same capacitive touch matrix 10 is now described with reference to flowchart 50 of FIG. 3. For a given sensing cycle, first noise is sensed (Block 52) while neither self capacitance nor mutual capacitance sensing techniques are applied. This step is optional, but may be used to help reduce or eliminate noise later sensed. Then, self capacitance sensing is performed (Block 54). Thereafter, mutual capacitance sensing is performed (Block 56). Firmware in the control circuitry 30 then processes the strength values generated by the self capacitance sensing and the mutual capacitance sensing (Block 58) so as to determine a touch coordinate or coordinates to report (Block 60).

Figure 4:
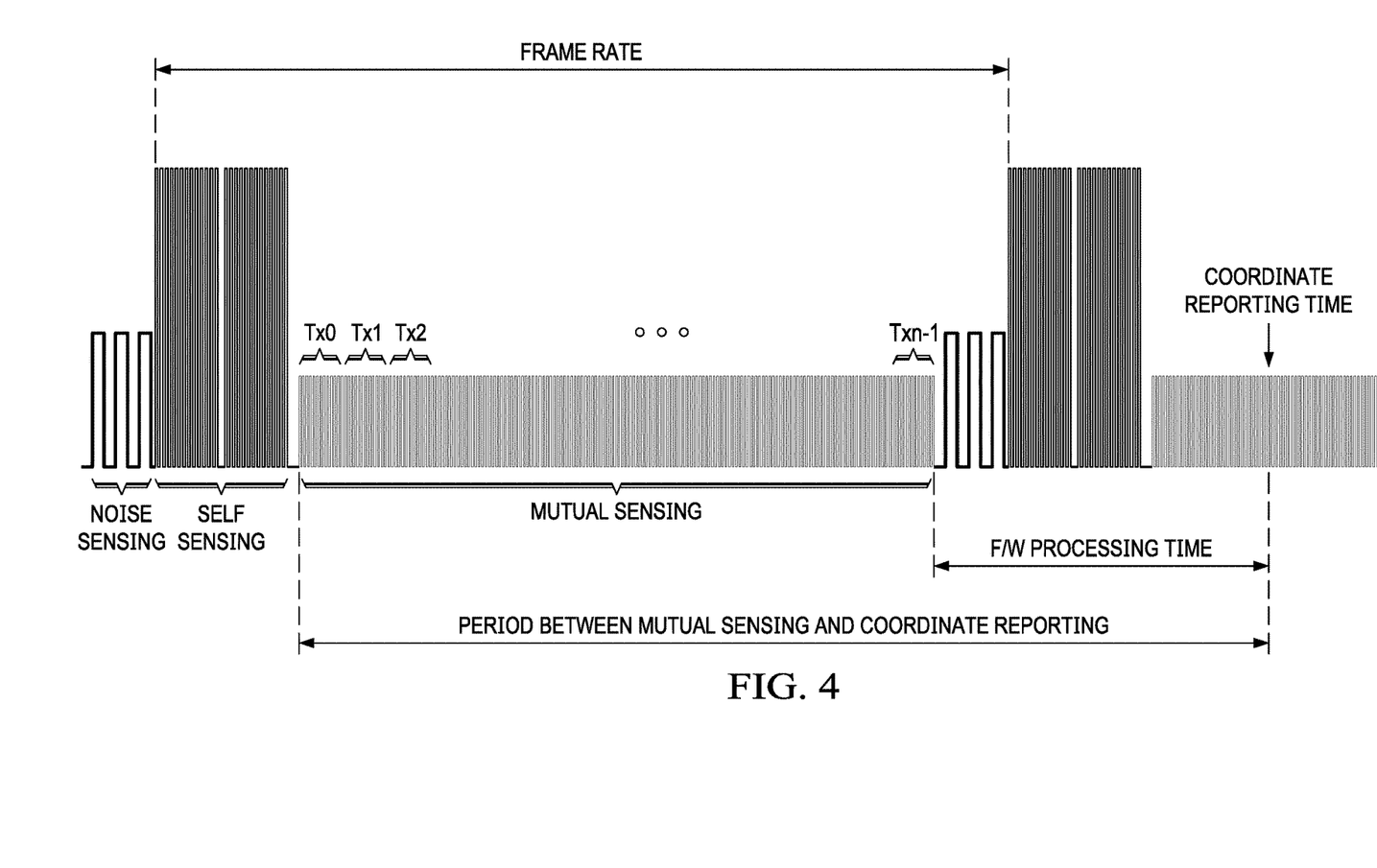
FIG. 4 is a graph showing waveforms of driving signals in the touch screen system of FIG. 3 over time, during self capacitance and mutual capacitance sensing modes.

This sequence, and relative times for performance of each step, can be seen in the graph of FIG. 4. Of note is that the elapsed time between the beginning of mutual capacitance sensing and the reporting of coordinates is necessarily greater than the frame rate. This means that there is necessarily a delay introduced between a touch and reporting of coordinates of that touch. This introduces lag into user interfaces of devices, such as smartphones and tablets, utilizing the capacitive touch matrix 10.

Since this lag is undesirable, the Inventors have devised a new sensing technique utilizing both self capacitance and mutual capacitance sensing that reduces the elapsed time between the beginning of mutual capacitance sensing and the reporting of coordinates to be less than the frame rate, which can enable the reduction or even elimination of the aforementioned lag.

Figure 5:
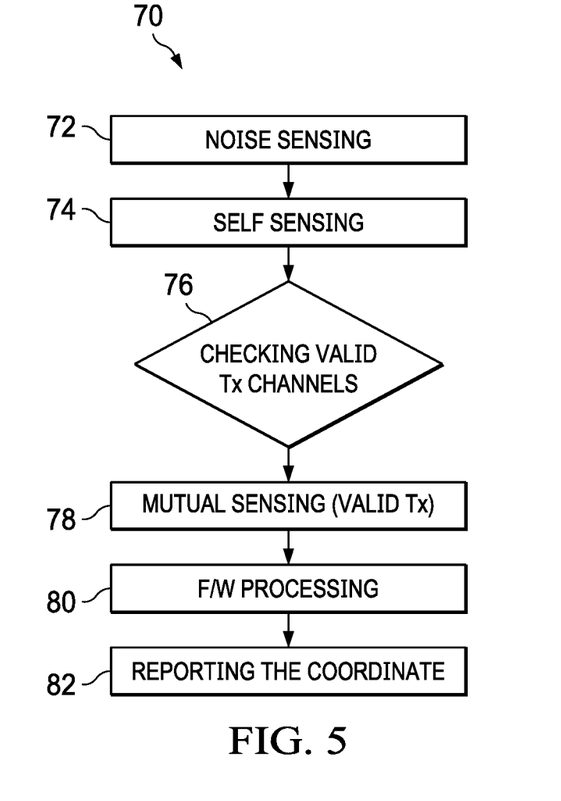
FIG. 5 is a flowchart of a method of operating a touch screen system, such as that of FIG. 2, in both self capacitance and partial mutual capacitance sensing modes.

This technique is now described with reference to flowchart 70 of FIG. 5. Here, noise sensing is performed (Block 72), as described above. Then, self capacitance sensing is performed (Block 74) as described above. Here, however "valid" columns (transmit channels) are determined based upon the strength values of those columns (Block 76). Columns having strength values that exceed a touch threshold, or having strength values within a touch range, are determined. Mutual capacitance sensing is then performed only on those "valid" columns (Block 78). Stated another way, the processing circuitry 30 instructs the driver 32 to output the driving or force signal only to the "valid" columns.

Figure 6:
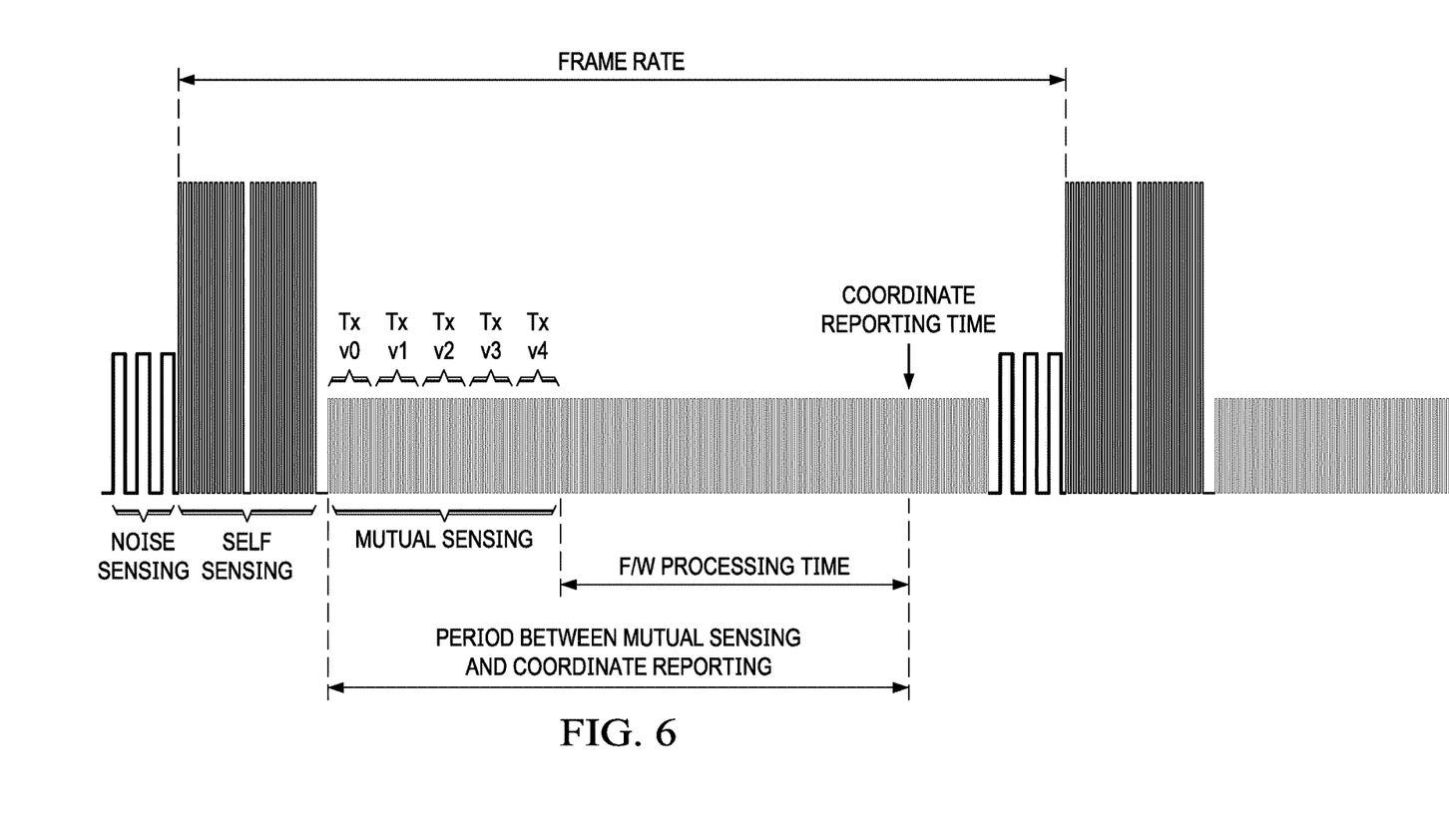
FIG. 6 is a graph showing waveforms of driving signals in the touch screen system of FIG. 5 over time, during self capacitance and partial mutual capacitance sensing modes.

Therefore, as can be seen in the graph of FIG. 6, since the "valid" columns will typically be a subset of all columns, the time for performing mutual capacitance sensing is greatly reduced. In many cases, the time for performing mutual capacitance sensing is reduced enough to allow coordinate reporting to be performed before the end of each frame. Thus, the time from the beginning of self sensing to the time of coordinate reporting can be less than the frame rate when using this technique. This can be used to reduce or eliminate the aforementioned lag.

It should be appreciated that in some applications, not just the "valid" columns have mutual capacitance sensing performed thereon. Indeed, for example, neighboring columns to "valid" columns may also have mutual capacitance sensing performed thereon.

It should also be appreciated that, during each touch, during the time period typically consumed for mutual capacitance sensing, there will be a sub-period of time in which no driving signal is being generated on a column. This frees up time for increasing the accumulation and sensing of the rows, thereby enhancing the accuracy of the strength values determined. Thus, using this technique, the signal to noise ratio of determined strength values is also improved.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method of operating a touch screen controller in a device with a touch screen having force conductors at which a forcing signal is received and also having sense conductors, the method comprising:
   receiving touch data from the touch screen;
   operating the touch screen in a self capacitance sensing mode and, in the self capacitance sensing mode, determining which force conductors have strength values indicating a potential touch to the touch screen; and
   operating the touch screen in a mutual capacitance sensing mode and, in the mutual capacitance sensing mode, performing mutual capacitance sensing by driving a subset of the force conductors with the forcing signal, the subset of the force conductors only including those force conductors that were determined in the self capacitance sensing mode to have strength values indicating the potential touch to the touch screen and certain force conductors neighboring those force conductors that were determined in the self capacitance sensing mode to have strength values indicating the potential touch to the touch screen.

2. The method of claim 1, wherein the force conductors having the strength values indicating the potential touch are determined by determining which force conductors have strength values that are greater than a threshold value.

3. The method of claim 2, wherein, in the mutual capacitance sensing mode, the mutual capacitance sensing is performed by driving only those force conductors which have strength values greater than the threshold value and the certain force conductors neighboring those force conductors which have strength values greater than the threshold value.

4. The method of claim 2, further comprising determining a coordinate of a touch to the touch screen as a function of the mutual capacitance sensing performed by driving the force conductors which have strength values greater than the threshold value.

5. A method of touch sensing for a touch screen having a first plurality of conductors and a second plurality of conductors intersecting the first plurality of conductors, the method comprising:
   operating the touch screen in a self capacitance sensing mode by:
      driving the first and second pluralities of conductors with a forcing signal; and
      measuring strength values at the first plurality of conductors and the second plurality of conductors;
   operating the touch screen in a mutual capacitance sensing mode by:
      driving only a subset of the first plurality of conductors, the subset including only those of the first plurality of conductors having strength values measured during the self capacitance sensing mode that indicate a potential touch to the touch screen and certain conductors of the first plurality of conductors neighboring those of the first plurality of conductors having strength values measured during the self capacitance sensing mode that indicate the potential touch to the touch screen, with a forcing signal; and
      measuring strength values at the second plurality of conductors during driving of the subset of the first plurality of conductors.

6. The method of claim 5, wherein ones of the first plurality of conductors having measured strength values indicating the potential touch have measured strength values that are greater than a threshold value.

7. The method of claim 5, further comprising determining a coordinate of a touch to the touch screen as a function of the strength values measured at the second plurality of conductors in the mutual capacitance sensing mode.

8. A touch screen controller operable with a touch screen having force conductors at which a forcing signal is received when driven, the touch screen also having sense conductors, the touch screen controller, comprising:
   input circuitry configured to receive touch data from the touch screen;
   processing circuitry configured to:
      operate the touch screen in a self capacitance sensing mode and, in the self capacitance sensing mode, determine a subset of the force conductors which have strength values in a range indicating a potential touch to the touch screen; and
      operate the touch screen in a mutual capacitance sensing mode and, in the mutual capacitance sensing mode, perform mutual capacitance sensing by driving only the subset of the force conductors determined during the self capacitance sensing mode to have strength values in the range indicating the potential touch and certain force conductors adjacent the subset of the force conductors determined during the self capacitance sensing mode to have strength values in the range indicating the potential touch.

9. The touch screen controller of claim 8, wherein the processing circuitry is further configured to determine the subset of the force conductors which have the strength values in the range indicating a potential touch by determining which force conductors have strength values that are greater than a threshold value.

10. The touch screen controller of claim 8, wherein the subset of the force conductors excludes force conductors which have strength values outside of the range indicating the potential touch.

11. The touch screen controller of claim 10, wherein the subset of the force conductors excludes force conductors which have strength values outside of the range indicating the potential touch have strength values that are less than a threshold value.

12. The touch screen controller of claim 8, wherein the processing circuitry is further configured to determine a coordinate of a touch to the touch screen as a function of the mutual capacitance sensing performed by driving the determined subset of force conductors and the certain force conductors adjacent the determined subset of force conductors.

13. A method of operating a touch screen controller in a device with a touch screen having sense conductors, the method comprising:
   in a sensing frame:
      in a self capacitance sensing period of the sensing frame, perform self capacitance sensing to detect a potential touch and the sense conductors associated with the potential touch; and
      in a mutual capacitance sensing period of the sensing frame, perform mutual capacitance sensing during only a fraction of the mutual capacitance sensing period, wherein the mutual capacitance sensing is performed by sensing on only those sense conductors determined during the self capacitance sensing period to be associated with the potential touch and certain sense conductors neighboring those sense conductors determined during the self capacitance sensing period to be associated with the potential touch.

14. The method of claim 13, wherein the potential touch is detected by determining which sense conductors have strength values exceeding a threshold.

15. The method of claim 13, wherein mutual capacitance sensing is not performed outside of the fraction of the mutual capacitance sensing period.

16. The method of claim 13, further comprising determining a coordinate of a touch to the touch screen as a function of the mutual capacitance sensing performed on those sense conductors associated with the potential touch.

* * * * *